(12) United States Patent
Mongoin et al.

(10) Patent No.: US 7,115,692 B2
(45) Date of Patent: Oct. 3, 2006

(54) GRINDING AND/OR FOR DISPERSING AID OF MINERAL MATERIALS IN AQUEOUS SUSPENSION, RESULTING AQUEOUS SUSPENSIONS AND USES THEREOF

(75) Inventors: Jacques Mongoin, Quincieux (FR); Christian Jacquemet, Lyons (FR); Jean-Marc Suau, Lucenay (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 10/450,454

(22) PCT Filed: Dec. 18, 2001

(86) PCT No.: PCT/FR01/04027

§ 371 (c)(1),
(2), (4) Date: Jun. 19, 2003

(87) PCT Pub. No.: WO02/49765

PCT Pub. Date: Jun. 27, 2002

(65) Prior Publication Data

US 2004/0077762 A1 Apr. 22, 2004

(30) Foreign Application Priority Data

Dec. 20, 2000 (FR) .................................. 00 16683

(51) Int. Cl.
*C08F 120/06* (2006.01)
*C08F 222/02* (2006.01)

(52) U.S. Cl. .................. 526/317.1; 524/430; 524/560; 524/563; 524/436

(58) Field of Classification Search ................ 524/425, 524/427, 413; 106/465; 523/333; 526/304, 526/307

See application file for complete search history.

(56) References Cited

U.S. PATENT DOCUMENTS

| | | | |
|---|---|---|---|
| 4,480,985 A * | 11/1984 | Davis | 431/1 |
| 5,109,090 A | 4/1992 | Mongoin et al. | |
| 5,297,740 A * | 3/1994 | Landscheidt et al. | 241/16 |
| 5,746,819 A * | 5/1998 | Kostelnik et al. | 106/447 |
| 5,891,972 A | 4/1999 | Egraz et al. | |
| 6,003,795 A * | 12/1999 | Bown et al. | 241/16 |
| 6,063,884 A | 5/2000 | Egraz et al. | |
| 6,093,764 A | 7/2000 | Egraz et al. | |
| 6,184,321 B1 | 2/2001 | Egraz et al. | |
| 6,197,104 B1 * | 3/2001 | Kostelnik et al. | 106/447 |
| 6,558,464 B1 * | 5/2003 | Kostelnik et al. | 106/447 |
| 2003/0019401 A1 * | 1/2003 | Schwartz et al. | 106/772 |

FOREIGN PATENT DOCUMENTS

| | | |
|---|---|---|
| EP | 0 100 948 | 2/1984 |
| EP | 0 113 046 | 7/1984 |
| EP | 0 278 880 | 8/1988 |
| EP | 0 542 643 | 5/1993 |
| EP | 0 542 644 | 5/1993 |
| JP | 2000281959 A * | 10/2000 |
| WO | WO 9200347 A1 * | 1/1992 |
| WO | 99 23185 | 5/1999 |
| WO | 01 48093 | 7/2001 |

OTHER PUBLICATIONS

U.S. Appl. No. 10/168,389, filed Jun. 21, 2002, Suau et al.
U.S. Appl. No. 10/311,219, filed Jul. 2, 2003, Suau et al.
U.S. Appl. No. 10/450,454, filed Jun. 19, 2003, Mongoin et al.
U.S. Appl. No. 10/070,424, filed Jul. 30, 2002, Suau et al.
U.S. Appl. No. 10/450,825, filed Jun. 18, 2003, Qiu et al.

* cited by examiner

*Primary Examiner*—David W. Wu
*Assistant Examiner*—Satya B. Sastri
(74) *Attorney, Agent, or Firm*—Oblon, Spivak, McClelland, Maier & Neustadt, P.C.

(57) ABSTRACT

The invention relates to the use of water-soluble homopolymers and/or copolymers of acrylic and/or methacrylic acid with one or more acrylic, vinyl or allyl monomers as a dispersion and/or grinding-aid agent for mineral particles in aqueous suspension.

The invention also concerns the said aqueous suspensions as well as their uses in the fields of paper, paint and plastics materials.

43 Claims, No Drawings

GRINDING AND/OR FOR DISPERSING AID OF MINERAL MATERIALS IN AQUEOUS SUSPENSION, RESULTING AQUEOUS SUSPENSIONS AND USES THEREOF

The present invention relates to the technical sector of mineral fillers, notably for papermaking applications, and appropriate treatments thereof in order to improve either the method of manufacturing the sheet of paper or its properties, as well as other applications such as notably paint or plastics materials.

The invention relates to the use of homopolymers and/or copolymers of acrylic and/or methacrylic acid with one or more acrylic, vinyl, or allyl monomers as a grinding-aid agent and/or dispersion agent for pigments and/or mineral fillers in aqueous suspension.

The invention also relates to the said aqueous suspensions of pigments and/or mineral fillers and uses thereof notably in the fields of paper, such as amongst other things the manufacturing or coating of paper, with the obtaining of improved properties of printability of the paper, as well as in the fields of paint or plastics materials.

Finally, the invention relates to the papers manufactured and/or coated by the use of the said aqueous suspensions of pigments and/or mineral fillers as well as the paints and/or plastics materials using the said suspensions.

For a long time already skilled man in the art has known about the use of grinding and/or dispersion agents of mineral particles in aqueous suspension consisting of acrylic polymers and/or copolymers, of low molecular weight, completely or partially neutralised by various neutralisation agents (FR 2 603 042, EP 0 100 947, EP 0 127 388, EP 0 129 329, EP 0 278 880, EP 0 542 644, EP 0 850 282).

Skilled man in the art also knows of the use of grinding and/or dispersion agents consisting of the fraction of the acrylic polymers and/or copolymers whose specific viscosity is between 0.3 and 0.8 (patents FR 2 488 814, EP 0 100 948, EP 0 542 643).

However, these various types of grinding and/or dispersion agents of low molecular weight, which make it possible to obtain aqueous suspensions of mineral particles which are refined, fluid and stable over time, do not result in aqueous suspensions of pigments and/or mineral fillers, notably calcium carbonate, having a small quantity of grinding-aid agent which is not adsorbed on the surfaces of the mineral material and is present in the aqueous phase of the suspension.

This quantity of grinding agent not adsorbed on the surfaces of the mineral particles and present in the aqueous phase of the suspension is, in the remainder of the present application, referred to as the free quantity of grinding agent.

Likewise, when free quantity of dispersant is spoken of in the remainder of the present application, it will be a case of a quantity of dispersant which is not adsorbed on the surfaces of the mineral particles and is present in the aqueous phase of the suspension.

This is because the aqueous phase of these aqueous suspensions of the prior art has high quantities of free dispersant and/or grinding-aid agent then having the drawback of impairing the properties of printability of the coated paper obtained by the use of the said aqueous suspensions of mineral particles as well as the drawback of requiring the use of high quantities of cationic agent used as a retention agent for the mineral filler on the cellulose fibre of the paper when the suspensions are used for the manufacture of sheets of paper.

Confronted with this problem of improving the properties of printability of the coated paper or reduction in the quantity of filler retention agent during the manufacture of the sheet of paper, related to the reduction in the quantity of free dispersant and/or grinding-aid agent in the aqueous phase of the aqueous suspensions of mineral particles used in the manufacture or coating of the paper, the Applicant then found, surprisingly, that the simultaneous selection of the molar rate of the active acid sites which have remained acidic and of the molar rate of the neutralisation of these active acid sites, by ions which are at least bifunctional, water-soluble homopolymers and/or copolymers of acrylic and/or methacrylic acid with one or more acrylic, vinyl or allyl monomers makes it possible to obtain aqueous suspensions of pigments and/or mineral fillers, notably calcium carbonate, having a small quantity of free dispersant and/or grinding-aid agent present in the aqueous phase of the suspension giving papermaking formulations such as notably papermaking coating colors or the mass filling of the paper with the properties described below.

This is because the use, according to the invention, of the said aqueous suspensions in the manufacture of the paper as a mass filling makes it possible to reduce the quantity of cationic agent used as a retention agent for the mineral filler on the cellulose fibre of the paper.

In parallel to these properties of the paper, the use according to the invention of the said aqueous suspensions during the coating of the paper makes it possible to obtain a coated paper with improved properties of printability.

Thus one of the aims of the invention is the use of water-soluble homopolymers and/or copolymers of acrylic and/or methacrylic acid with one or more acrylic, vinyl or allyl monomers specifically neutralised, as a grinding-aid and/or dispersion agent for pigments and/or mineral fillers in aqueous suspension making it possible to obtain aqueous suspensions of pigments and/or mineral fillers, notably calcium carbonate, having a small quantity of free dispersant and/or grinding-aid agent present in the aqueous phase of the suspension giving papermaking formulations such as notably papermaking coating slips or the mass filling for the paper, having the aforementioned properties.

Another aim of the invention, apart from those already mentioned, is to provide aqueous suspensions of mineral materials obtained by dispersion and characterised in that they have a small quantity of free dispersant present in the aqueous phase and in that they contain 0.05% to 5% by dry weight, and preferentially 0.2% to 1.0% by dry weight with respect to the dry weight of mineral material, of dispersion agent for mineral particles in aqueous suspension used according to the invention.

Likewise, another aim of the invention, apart from those already mentioned, is to provide aqueous suspensions of refined mineral materials obtained by grinding and characterised in that they have a small quantity of free grinding-aid agent present in the aqueous phase and in that they contain 0.05% to 5% by dry weight, and preferably 0.2% to 1.0% by dry weight, with respect to the dry weight of mineral material, of grinding-aid agent in aqueous suspension used according to the invention.

Finally, an additional aim of the invention concerns the use of these mineral aqueous suspensions in the field of plastics, paint, paper coating and mass filling during the manufacture of the paper sheet.

Contrary to the teachings of the prior art, the Applicant found surprisingly that the selection of the molar percentage of the non-neutralised active acidic sites of the polymer must be between 10% and 60% and the molar percentage of the neutralisation by at least one neutralisation agent which is at least bifunctional must be between 10% and 80% in order to obtain the aforementioned properties. The remainder to 100% of the active acidic sites of the polymer is neutralised by monofunctional neutralisation agents.

The at least bifunctional neutralisation agents are chosen from amongst the hydroxides and/or oxides of alkaline-earth or metallic cations, in particular the hydroxides and/or oxides of magnesium, calcium, barium, zinc or aluminium, or from amongst the bifunctional amines or mixtures thereof, and are preferably chosen from amongst the calcium or magnesium hydroxides and/or oxides, and mixtures thereof.

The monofunctional neutralisation agents are chosen from amongst the hydroxides of alkaline cations, in particular sodium and potassium, or lithium or ammonia, or from amongst the aliphatic and/or cyclic primary or secondary amines such as for example the ethanolamines, mono- and diethylamine or cyclohexylamine, or mixtures thereof, and are very particularly chosen from amongst the compounds containing the sodium ion.

These homopolymers and/or copolymers result from the various known methods of radical polymerisation using the polymerisation initiators well known to skilled man in the art such as for example compounds based on hydroxylamine or using the polymerisation initiators such as peroxides such as notably hydrogen peroxide, tert-butyl hydroperoxide or persalts such as notably sodium persulphate, ammonium persulphate, potassium persulphate or the like, or sodium hypophosphite, hypophosphorous acid or phosphorous acid and/or the salts thereof in the possible presence of metallic salts, for example iron or copper, in a polymerisation medium which may be water, methanol, ethanol, propanol, isopropanol, butanols or mixtures thereof or dimethyl formamide, dimethylsulphoxide, tetrahydrofuran, acetone, methylethylketone, ethyl acetate, butyl acetate, hexane, heptane, benzene, toluene or xylene, and in the presence possibly of molecular weight regulators, also referred to as transfer agents, such as notably mercaptoethanol, thioglycolic acid and esters thereof, n-dodecylmercaptan, acetic, tartric, lactic, citric, gluconic or glucoheptonic acids, 2-mercaptopropionic acid, thiodiethanol, halogenated solvents such as carbon tetrachloride, chloroform, methylene chloride, the monopropylene glycol ethers, or mixtures thereof and the like.

These homopolymers used as a grinding-aid and/or dispersion agent according to the invention result from the various methods of radical polymerisation of acrylic or methacrylic acid.

These copolymers used as a grinding-aid and/or dispersion agent according to the invention result from the various aforementioned methods of radical copolymerisation of acrylic or methacrylic acid with at least one of the monomers chosen from amongst acrylic acid, methacrylic acid, itaconic acid, crotonic acid, fumaric acid, maleic anhydride and/or 2-acrylamido-2-methyl-1-propanesulphonic acid in acidic or partially neutralised form, 2-methacrylamido-2-methyl-1-propanesulphonic acid in acidic or partially neutralised form, 3-methacrylamido-2-hydroxy-1-propanesulphonic acid in acidic or partially neutralised form, allylsulphonic acid, methallylsulphonic acid, allyloxybenzene sulphonic acid, methallyloxybenzene sulphonic acid, 2-hydroxy-3-(2-propenyloxy)propanesulphonic acid, 2-methyl-2-propene-1-sulphonic acid, ethylene sulphonic acid, propene sulphonic acid, 2-methyl sulphonic acid, styrene sulphonic acid and/or its salts, vinyl sulphonic acid, sodium methallylsulphonate, sulphopropyl acrylate or methacrylate, sulphomethylacrylamide or sulphomethylmethacrylamide or from amongst acrylamide, methacrylamide, esters of acrylic or methacrylic acids such as notably ethyl acrylate, butyl acrylate, methyl methacrylate, ethylene or propylene glycol acrylate or methacrylate phosphate or from amongst vinylpyrrolidone, vinylcaprolactam, isobutylene, diisobutylene, vinyl acetate, styrene, alphamethylstyrene, vinylmethylether, the allyls such as notably allyl amine and derivatives thereof.

These homopolymers and/or copolymers used as a grinding-aid and/or dispersion agent according to the invention resulting from the various aforementioned radical polymerisation methods can also be treated by any known means in order to isolate it in the form of a powder and to use it in this form.

According to another variant, the homopolymer or copolymer resulting from the polymerisation reaction may, optionally before or after the neutralisation reaction, be treated and separated into several phases, according to static or dynamic methods known to skilled man in the art, by one or more polar solvents belonging notably to the group consisting of water, methanol, ethanol, propanol, isopropanol, butanols, acetone, tetrahydrofuran or mixtures thereof.

One of the phases then corresponds to the polymer used according to the invention as a grinding-aid and/or dispersion agent for mineral materials in aqueous suspension.

These homopolymers and/or copolymers used as a dispersion and/or grinding-aid agent according to the invention are selectively neutralised so that the molar percentage of active acid sites of the non-neutralised polymer is between 10% and 60% and that of the active acid sites neutralised by at least one at least bifunctional neutralisation agent is between 10% and 80%, the remainder to 100% of the active acid sites of the polymer being neutralised by monofunctional neutralisation agents.

Preferentially, these homopolymers and/or copolymers used as dispersion and/or grinding-aid agents according to the invention are selectively neutralised so that the molar percentage of the active acid sites of the non-neutralised polymer is between 15% and 30% and that of the active acid sites neutralised by at least one at least bifunctional neutralisation agent is between 15% and 60%, the remainder to 100% of the active acid sites of the polymer being neutralised by monofunctional neutralisation agents.

Thus, according to the invention, the use of homopolymers and/or copolymers of acrylic and/or methacrylic acid with one or more acrylic, vinyl or allyl monomers as a dispersion and/or grinding-aid agent for pigments and/or mineral fillers in aqueous suspension is characterised in that the said homopolymers and/or copolymers of acrylic and/or methacrylic acid with one or more acrylic, vinyl or allyl monomers are neutralised so that the molar percentage of the active acid sites of the non-neutralised polymer is between 10% and 60% and that of the active acid sites neutralised by at least one at least bifunctional neutralisation agent is between 10% and 80%, the remainder to 100% of the active acid sites of the polymer being neutralised by monofunctional neutralisation agents.

Preferentially, the use according to the invention of homopolymers and/or copolymers of acrylic and/or methacrylic acid with one or more acrylic, vinyl or allyl monomers as a grinding-aid and/or dispersion agent for pigments and/or mineral fillers in aqueous suspension is characterised in that the said homopolymers and/or copolymers of acrylic and/or methacrylic acid with one or more acrylic, vinyl or allyl monomers are neutralised so that the molar percentage of the active acid sites of the non-neutralised polymer is between 15% and 30% and that of the active acid sites neutralised by at least one at least bifunctional neutralisation agent is between 15% and 60%, the remainder to 100% of the active acid sites of the polymer being neutralised by monofunctional neutralisation agents.

The homopolymers and/or copolymers intended to be used according to the invention as a grinding-aid and/or dispersion agent in water for mineral particles are selected from amongst the homopolymers or copolymers having a mean molecular weight in terms of $M_W$ weight of between 1000 and 50,000, preferentially between 3500 and 25,000, determined by aqueous gel permeation chromatography (GPC), the standards for which, used as references, belong to a series of sodium polyacrylates sold by the company Polymer Standards Service under the names PSS-PAA varying from 18K to 2K.

Moreover, the use according to the invention of a selection of water-soluble homopolymers and/or copolymers of acrylic and/or methacrylic acid with one or more acrylic, vinyl or allyl monomers allows the grinding of mineral substances, notably calcium carbonate, resulting in the obtaining of aqueous suspensions of mineral materials which are refined, fluid and stable over time, having a small quantity of free dispersant present in the aqueous phase of the solution making it possible to achieve papermaking formulations such as notably papermaking coating slips or the mass filling for the paper, having the aforementioned properties.

Thus, according to the invention, the aqueous suspensions of pigments and/or mineral fillers obtained by grinding are characterised in that they contain the said grinding-aid agent and in that their aqueous phase contains less than 10% of the quantity of grinding-aid agent initially introduced into the suspension before the grinding operation.

Likewise according to the invention the aqueous suspensions of pigments and/or mineral fillers obtained by dispersion are characterised in that they contain the said dispersion agent and in that their aqueous phase contains less than 60%, preferentially less than 55% of the quantity of dispersion agent initially introduced into the suspension.

These quantities of grinding-aid and/or dispersion agent contained in the aqueous phase of the suspensions of pigments and/or mineral fillers according to the invention, also referred to as quantities of free dispersant and/or grinding-aid agent, are measured by the measuring method described below, referred to in the present application as the TOC method.

The principle of this measurement is as follows:

The quantity of polymer (grinding-aid agent and/or dispersion agent used according to the invention) present in the solution before the grinding or suspension is determined, using a TOC meter. The value TOC 1 is obtained.

The quantity of polymer (the grinding-aid and/or dispersion agent used according to the invention) present in the solution after the grinding or dispersion is measured after filtration of the suspension using the same TOC meter and gives the value TOC 2.

The quantities of grinding-aid and/or dispersion agent contained in the aqueous phase of the suspensions of pigments and/or mineral fillers according to the invention, also referred to as quantities of free dispersant and/or grinding-aid agent, are then expressed by the equation:

$$\% \text{ of free dispersant and/or grinding-aid agent} = \frac{TOC2}{TOC1} \times 100$$

In practical terms, the suspension of mineral particles to be studied is first of all filtered on an "API Fluid Loss Measurement" filter press from Baroïd equipped with a 90 mm diameter filter paper (Whatman N° 50) and a metallic sieve.

The filtration is carried out at a pressure of 100 psi (7 bar). The filtrate obtained is then filtered once again on a Millipore™ filter with a 0.2 micrometer porosity.

The waters then obtained are analysed using a TOC meter of the Lab TOC™ make sold by Spectrafrance making it possible to determine the total organic carbon (TOC) present in the solution by measuring the release of carbon dioxide obtained after a complete oxidation of the organic material catalysed by means of ultraviolet radiation in the presence of sodium persulphate and phosphoric acid at respective contents of 2.5% and 6.8% and under oxygen bubbling.

The aqueous suspensions of pigment and/or mineral filler are also characterised in that the filler and/or pigment is chosen from amongst natural calcium carbonate such as notably calcite, chalk or marble, synthetic calcium carbonate, also known as precipitated calcium carbonate, dolomites, magnesium hydroxide, gypsum or aluminium hydroxide or mixtures thereof or any other filler and/or pigment normally used in the field of papermaking, paint and/or plastics materials.

The aqueous suspensions of fillers and/or pigments obtained by grinding according to the invention are more particularly characterised in that they contain 0.05% to 5% by dry weight of the said agent with respect to the total dry weight of the fillers and/or pigments, and also more particularly 0.2% to 1.0% by dry weight of the said agent with respect to the total dry weight of the fillers and/or pigments and in that their aqueous phase contains less than 10%, determined according to the aforementioned method, of the quantity of grinding aid agent initially introduced into the suspension before the grinding operation.

In practice, the operation of grinding the mineral substance to be refined consists of grinding the mineral substance with a grinding body consisting of very fine particles in an aqueous medium containing initially all or part of the quantity of the grinding-aid agent with grinding conditions adjusted so that the final pH of the ground suspension is between 8 and 10, preferentially between 8.5 and 9.5.

An aqueous suspension of the mineral substance to be ground is formed.

While initially using part of the quantity of the grinding-aid agent, the remainder is added in parallel during the mechanical grinding operation.

To the suspension of the mineral substance to be ground, there is added the grinding body with a granulometry advantageously between 0.20 and 4 millimeters. The grinding body is generally in the form of particles of materials as diverse as silicon oxide, aluminium oxide, zirconium oxide or mixtures thereof, as well as high-hardness synthetic resins, steels, or others. An example of the composition of such grinding bodies is given by the patent FR 2 303 681, which describes grinding elements formed by 30 to 70% by weight zirconium oxide, 0.1 to 5% aluminium oxide, and 5 to 20% silicon oxide. The grinding body is preferably added to the suspension in a quantity such that the ratio by weight between this grinding material and the mineral substance to be ground is at least 2/1, this ratio preferably being between the limits 3/1 and 5/1.

The mixture of the suspension and grinding body is then subjected to the mechanical stirring action such as that which occurs in a conventional grinder with microelements.

The grinding-aid agent according to the invention is also introduced, on one or more occasions, into the mixture formed by the aqueous suspension of mineral substances and the grinding body at the rate of 0.05% to 5% by weight, and preferentially 0.2% to 1.0% by weight, of the dried fraction of the said polymers with respect to the dry weight of the mineral substance to be refined.

The time necessary for achieving excellent fineness of the mineral substance after grinding varies according to the nature and quantity of the mineral substances to be ground, and according to the stirring mode used and the temperature of the medium during the grinding operation.

The aqueous suspensions of fillers and/or pigments obtained by dispersion according to the invention are characterised more particularly in that they contain 0.05% to 5% by dry weight of the said agent with respect to the total dry weight of the fillers and/or pigments, and also more particularly 0.2% to 1.0% by dry weight of the said agent with respect to the total dry weight of the fillers and/or pigments and in that their aqueous phase contains less than 60%, preferably less than 55%, determined according to the aforementioned method, of the quantity of dispersion agent initially introduced into the suspension.

In practice, the dispersion operation consists of introducing the mineral filler into an aqueous solution containing all or some of the dispersing agent, the remainder of which is possibly added in parallel to the addition of the mineral filler.

The aqueous suspensions thus obtained can be used in the field of papermaking for mass filling or coating.

The papers manufactured and/or coated are characterised in that they contain the said aqueous suspensions of fillers and/or pigments according to the invention.

The papers manufactured by the use of the mass filling composition according to the invention are characterised in that they contain less retention agent for mineral filler on the cellulose fibres than the papers of the prior art.

The papers coated by the use of the coating color according to the invention are characterised in that they have increased printability, that is to say printability greater than the printability of the coated papers of the prior art.

The scope and advantage of the invention will be perceived more clearly by means of the following examples, which are not limitative.

EXAMPLE 1

This example relates to the selection of the proportion of active acid sites which have remained non-neutralised and the proportion of one or more at least bifunctional agents characteristic of the homopolymer and/or copolymer intended according to the invention to be used as a grinding-aid agent for obtaining an aqueous suspension of refined natural calcium carbonate with a low quantity of free grinding-aid agent present in the aqueous phase.

For each test, the different grinding-aid agents are tested by the introduction, in the quantities indicated in the table below, expressed as a percentage by dry weight with respect to the weight of dry calcium carbonate to be ground, of the grinding-aid agent in a suspension of calcium carbonate to be ground.

For all the tests of the example, the calcium carbonate to be ground is a calcite with a granulometry such that 19.0% of particles have a diameter of less than 2 micrometers.

The suspension circulates in a grinder of the Dyno-Mill™ type with fixed cylinder and rotating impeller, the grinding body of which consists of corundum balls with a diameter lying in the range 0.6 millimeters to 1.0 millimeter.

The total volume occupied by the grinding body is 1150 cubic centimeters whilst its weight is 2900 g.

The grinding chamber has a volume of 1400 cubic centimeters.

The circumferential speed of the grinder is 10 meters per second.

The calcium carbonate suspension is recycled at the rate of 18 liters per hour.

The discharge from the Dyno-Mill™ grinder is provided with a separator with a 200 micron mesh for separating the suspension resulting from the grinding and the grinding body.

The temperature during each grinding test is maintained at approximately 60° C.

At the end of the grinding (To), a sample of the pigmentary suspension is recovered in a flask. The granulometry of this suspension is measured by means of a Sedigraph™ 5100 granulometer from Micromeritics.

Test N° 1:

This test, which illustrates the prior art, uses a suspension, obtained by grinding calcite with 76.0% by dry matter and 1.00% by dry weight, with respect to the dry weight of calcite, of a completely neutralised sodium polyacrylate with a mean molecular weight, in terms of $M_W$ weight, of 7000, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 95.0% of particles have a diameter of less than 2 micrometers and a proportion of free grinding-aid agent present in the aqueous phase of the suspension, measured according to the method described above, equal to 48.0%.

Test N° 2:

This test, which illustrates the prior art, uses a suspension, obtained by grinding calcite with 75.0% by dry matter and 0.35% by dry weight, with respect to the dry weight of calcite, of a mixed calcium and sodium polyacrylate (30% calcium-70% sodium molar) with a mean molecular weight, in terms of $M_W$ weight, of 5500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 60.2% of particles have a diameter of less than 2 micrometers and a proportion of free grinding-aid agent present in the aqueous phase of the suspension, measured according to the method described above, equal to 15.0%.

Test N° 3:

This test, which illustrates the prior art, uses a suspension, obtained by grinding marble with 74.9% by dry matter and 0.63% by dry weight, with respect to the dry weight of marble, of a mixed sodium and calcium polyacrylate (70% sodium-30% calcium molar) with a mean molecular weight, in terms of $M_W$ weight, of 4500, determined by aqueous GPC, the standards for which, used as references, belong to a series of sodium polyacrylates sold by the company Polymer Standards Service under the names PSS-PAA varying from 18K to 2K.

The aqueous suspension of marble obtained has a granulometry such that 89.1% of particles have a diameter of less than 2 micrometers and a proportion of free grinding-aid agent present in the aqueous phase of the suspension, measured according to the method described above, equal to 21.6%.

Test N° 4:

This test, which illustrates a field outside the invention, uses a suspension, obtained by grinding calcite at 76.0% by dry matter and 1.00% by dry weight, with respect to the dry weight of calcite, of a sodium polyacrylate (5% free carboxylic-95% sodium molar) with a mean molecular weight in terms of $M_W$ weight of 5500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 95.0% of particles have a diameter of less than 1 micrometer and a proportion of free grinding-aid agent present in the aqueous phase of the suspension, measured according to the method described above, equal to 40.0%.

Test N° 5:

This test, which illustrates the invention, uses a suspension, obtained by grinding calcite at 75.0% by dry matter and 0.60% by dry weight, with respect to the dry weight of calcite, of a mixed sodium-calcium polyacrylate (10% free carboxylic-70% sodium-20% calcium molar) with a mean molecular weight in terms of $M_W$ weight of 5500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 90.2% of particles have a diameter of less than 2 micrometers and a proportion of free grinding-aid agent present in the aqueous phase of the suspension, measured according to the method described above, equal to 8.4%.

Test N° 6:

This test, which illustrates the invention, uses a suspension, obtained by grinding calcite at 75.0% by dry matter and 0.30% by dry weight, with respect to the dry weight of calcite, of a mixed sodium-calcium polyacrylate (20% free carboxylic-70% sodium-10% calcium molar) with a mean molecular weight in terms of $M_W$ weight of 5500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 59.7% of particles have a diameter of less than 2 micrometers and a proportion of free grinding-aid agent present in the aqueous phase of the suspension, measured according to the method described above, equal to 9.5%.

Test N° 7:

This test, which illustrates the invention, uses a suspension, obtained by grinding calcite at 75.3% by dry matter and 0.38% by dry weight, with respect to the dry weight of calcite, of a mixed sodium-calcium polyacrylate (25% free carboxylic-40% sodium-35% calcium molar) with a mean molecular weight in terms of $M_W$ weight of 5500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 88.1% of particles have a diameter of less than 2 micrometers and a proportion of free grinding-aid agent present in the aqueous phase of the suspension, measured according to the method described above, equal to 9.6%.

Test N° 8:

This test, which illustrates the prior art, uses a suspension, obtained by grinding calcite at 72.0% by dry matter and 0.65% by dry weight, with respect to the dry weight of calcite, of a mixed polyacrylate of magnesium and sodium (50% magnesium-50% sodium molar) with a mean molecular weight in terms of $M_W$ weight of 5500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 90.4% of particles have a diameter of less than 2 micrometers and a proportion of free grinding-aid agent present in the aqueous phase of the suspension, measured according to the method described above, equal to 13.0%.

Test N° 9:

This test, which illustrates the invention, uses a suspension, obtained by grinding calcite at 72.0% by dry matter and 0.65% by dry weight, with respect to the dry weight of calcite, of a mixed polyacrylate of sodium and magnesium (25% free carboxylic-25% sodium-50% magnesium molar) with a mean molecular weight in terms of $M_W$ weight of 5500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 89.7% of particles have a diameter of less than 2 micrometers and a proportion of free grinding-aid agent present in the aqueous phase of the suspension measured, according to the method described above, equal to 5.4%.

Test N° 10:

This test, which illustrates the invention, uses a suspension, obtained by grinding calcite at 72.0% by dry matter and 0.65% by dry weight, with respect to the dry weight of calcite, of a mixed polyacrylate of sodium and magnesium (25% free carboxylic-45% sodium-30% magnesium molar) with a mean molecular weight in terms of $M_W$ weight of 5500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 90.3% of particles have a diameter of less than 2 micrometers and a proportion of free grinding-aid agent present in the aqueous phase of the suspension, measured according to the method described above, equal to 8.2%.

Test N° 11:

This test, which illustrates the invention, uses a suspension, obtained by grinding calcite at 75.0% by dry matter and 0.60% by dry weight, with respect to the dry weight of calcite, of a mixed polyacrylate of sodium and magnesium (10% free carboxylic-30% sodium-60% magnesium molar) with a mean molecular weight in terms of $M_W$ weight of 3500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 90.5% of particles have a diameter of less than 2 micrometers and a proportion of free grinding-aid agent present in the aqueous phase of the suspension, measured according to the method described above, equal to 9.9%.

Test N° 12:

This test, which illustrates the invention, uses a suspension, obtained by grinding calcite at 75.0% by dry matter and 0.60% by dry weight, with respect to the dry weight of calcite, of a copolymer acrylic acid—ethylene glycol phosphate methacrylate—methyl methacrylate (respectively 54.6%–34.6%–10.8% weight) and neutralised with sodium and magnesium (20% free carboxylic-40% sodium-40% magnesium molar) with a mean molecular weight in terms of $M_W$ weight of 15 000, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 80.4% of particles have a diameter of less than 2 micrometers and a proportion of free grinding-aid agent present in the aqueous phase of the suspension, measured according to the method described above, equal to 9.3%.

Test N° 13:

This test, which illustrates the invention, uses a suspension, obtained by grinding calcite at 75.0% by dry matter and 0.60% by dry weight, with respect to the dry weight of calcite, of a mixed polyacrylate of sodium and zinc (20% free carboxylic-70% sodium-10% zinc molar) with a mean molecular weight in terms of $M_W$ weight of 12 000, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 60.1% of particles have a diameter of less than 2 micrometers and a proportion of free grinding-aid agent present in the aqueous phase of the suspension, measured according to the method described above, equal to 9.6%.

Test N° 14:

This test, which illustrates the invention, uses a suspension, obtained by grinding calcite at 75.0% by dry matter and 0.60% by dry weight, with respect to the dry weight of calcite, of a mixed polyacrylate of magnesium and sodium (50% free carboxylic-10% magnesium-40% sodium molar) with a mean molecular weight in terms of $M_W$ weight of 5 500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 82% of particles have a diameter of less than 2 micrometers and a proportion of free grinding-aid agent present in the aqueous phase of the suspension, measured according to the method described above, equal to 9.0%.

Test N° 15:

This test, which illustrates the invention, uses a suspension, obtained by grinding calcite at 75.0% by dry matter and 0.60% by dry weight, with respect to the dry weight of calcite, of a copolymer acrylic acid—maleic anhydride (respectively 70%–30% weight) and neutralised with sodium and magnesium (35% free carboxylic-50% sodium-15% magnesium molar) with a mean molecular weight in terms of $M_W$ weight of 25 000, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 57.9% of particles have a diameter of less than 2 micrometers and a proportion of free grinding-aid agent present in the aqueous phase of the suspension, measured according to the method described above, equal to 9.7%.

Test N° 16:

This test, which illustrates the invention, uses a suspension, obtained by grinding calcite at 75.0% by dry matter and 0.60% by dry weight, with respect to the dry weight of calcite, of a copolymer acrylic acid—acrylamido methyl propane sulfonic acid (respectively 60%–40% weight) and neutralised with sodium and calcium (25% free carboxylic-45% sodium-30% calcium molar) with a mean molecular weight in terms of $M_W$ weight of 20 000, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 81.3% of particles have a diameter of less than 2 micrometers and a proportion of free grinding-aid agent present in the aqueous phase of the suspension, measured according to the method described above, equal to 8.7%.

Test N° 17:

This test, which illustrates the invention, uses a suspension, obtained by grinding calcite at 75.0% by dry matter and 0.60% by dry weight, with respect to the dry weight of calcite, of a copolymer acrylic acid—acrylamide (respectively 70%–30% weight) and neutralised with sodium and magnesium (30% free carboxylic-55% sodium-15% magnesium molar) with a mean molecular weight in terms of $M_W$ weight of 5 500, determined by aqueous GPC, the standards for which, used as references, belong to a series of sodium polyacrylates sold by the company Polymer Standards Service under the names PSS-PAA varying from 18K to 2K.

The aqueous suspension of calcite obtained has a granulometry such that 87.9% of particles have a diameter of less than 2 micrometers and a proportion of free grinding-aid agent present in the aqueous phase of the suspension, measured according to the method described above, equal to 9.5%.

The results of the different tests are set out in Tables 1a. and 1b. below.

TABLE 1a

| | Test N° | Quantity of agent (%) | molar % neutralisation COOH | Ca | Mg | Na | Granulometry (% <2 μm) | Dry matter concentration | % free grinding-aid agent |
|---|---|---|---|---|---|---|---|---|---|
| Prior art | 1 | 1.00 | 0 | 0 | 0 | 100 | 95.0 | 76.0 | 48.0 |
| Prior art | 2 | 0.35 | 0 | 30 | 0 | 70 | 60.2 | 75.0 | 15.0 |
| Prior art | 3 | 0.63 | 0 | 30 | 0 | 70 | 89.1 | 74.9 | 21.6 |
| Outside the invention | 4 | 1.00 | 5 | 0 | 0 | 95 | 95.0 | 76.0 | 40.0 |
| Invention | 5 | 0.60 | 10 | 20 | 0 | 70 | 90.2 | 75.0 | 8.4 |
| Invention | 6 | 0.30 | 20 | 10 | 0 | 70 | 59.7 | 75.0 | 9.5 |
| Invention | 7 | 0.38 | 25 | 35 | 0 | 40 | 88.1 | 75.3 | 9.6 |
| Prior art | 8 | 0.65 | 0 | 0 | 50 | 50 | 90.4 | 72.0 | 13.0 |
| Invention | 9 | 0.65 | 25 | 0 | 50 | 25 | 89.7 | 72.0 | 5.4 |
| Invention | 10 | 0.65 | 25 | 0 | 30 | 45 | 90.3 | 72.0 | 8.2 |

TABLE 1b

| | Test N° | Quantity of agent (%) | molar % neutralisation COOH | Ca | Mg | Na | Granulometry (% < 2 μm) | Dry matter concentration | % free grinding-aid agent |
|---|---|---|---|---|---|---|---|---|---|
| Invention | 11 | 0.60 | 10 | 0 | 60 | 30 | 90.5 | 75.0 | 9.9 |
| Invention | 12 | 0.60 | 20 | 0 | 40 | 40 | 80.4 | 75.0 | 9.3 |
| Invention | 13 | 0.60 | 20 | 10 Zn | 0 | 70 | 60.1 | 75.0 | 9.6 |
| Invention | 14 | 0.60 | 50 | 0 | 10 | 40 | 82.0 | 75.0 | 9.0 |
| Invention | 15 | 0.60 | 35 | 0 | 15 | 50 | 57.9 | 75.0 | 9.7 |
| Invention | 16 | 0.60 | 25 | 30 | 0 | 45 | 81.3 | 75.0 | 8.7 |
| Invention | 17 | 0.60 | 30 | 0 | 15 | 55 | 87.9 | 75.0 | 9.5 |

A reading of the different results in Tables 1a. and 1b. shows that, in order to obtain a percentage of free grinding-aid agent present in the aqueous phase of the suspension, after grinding measured according to the method described above, of less than 10%, the selection of the molar percentage of the non-neutralised active acid sites of the polymer must be between 10% and 60% and the molar percentage of the neutralisation by at least one at least bifunctional neutralisation agent must be between 10% and 80% in order to obtain the aforementioned properties, the remainder to 100% of the active acid sites of the polymer being neutralised by monofunctional neutralisation agents.

EXAMPLE 2

This example relates to the selection of the proportion of active acid sites which have remained non-neutralised and of the proportion of one or more at least bifunctional agents characteristic of the homopolymer and/or copolymer intended according to the invention to be used as a dispersion agent, also referred to as a dispersing agent for obtaining an aqueous suspension of mineral filler and more particularly synthetic calcium carbonate with a small quantity of free dispersing agent present in the aqueous phase.

To do this, the test is carried out by introducing, into water, 0.73 percent by dry weight with respect to the dry weight of the mineral filler to be dispersed, of the dispersing agent to be tested.

After homogenisation, a sample of the water with dispersant added is taken in order to measure the TOC1 and then the mineral filler to be dispersed is introduced and kept stirred for 30 minutes.

Once the stirring has stopped, a sample of the aqueous suspension is taken in order to measure its TOC2.

The determination of the percentage of free dispersant contained in the aqueous phase of the aqueous suspension of mineral fillers is carried out in the same way as before.

Test N° 18:

This test, which illustrates the prior art, uses a suspension of precipitated calcium carbonate (PCC) sold by Solvay under the name Socal™ P3 with a dry matter concentration of 70% and 0.73% by dry weight, with respect to the dry weight of PCC, of a completely neutralised sodium polyacrylate with a mean molecular weight, in terms of $M_W$ weight, of 5500, determined by aqueous GPC, the standards for which, used as references, belong to a series of sodium polyacrylates sold by the company Polymer Standards Service under the names PSS-PAA varying from 18K to 2K.

The aqueous suspension of PCC obtained has a percentage of free dispersion agent present in the aqueous phase of the suspension, measured according to the method described previously, of 67%.

Test N° 19:

This test, which illustrates the invention, uses a suspension of PCC sold by Solvay under the name Socal™ P3 with a dry matter concentration of 70% and 0.7% by dry weight, with respect to the dry weight of PCC, of a mixed sodium and calcium polyacrylate (25% free carboxylic-40% sodium-35% calcium molar) with a mean molecular weight, in terms of $M_W$ weight, of 5500, determined by aqueous GPC, the standards for which, used as references, belong to a series of sodium polyacrylates sold by the company Polymer Standards Service under the names PSS-PAA varying from 18K to 2K.

The aqueous suspension of PCC obtained has a percentage of free dispersion agent present in the aqueous phase of the suspension, measured according to the method described previously, of 51%.

A reading of these different results shows that, in order to obtain a percentage of free dispersant present in the aqueous phase of the suspension obtained by dispersion, measured according to the method described previously, of less than 60%, preferentially less than 55%, the selection of the molar percentage of the non-neutralised active acid sites of the polymer must be between 10% and 60% and the molar percentage of the neutralisation by at least one at least bifunctional neutralisation agent must be between 10% and 80% in order to obtain the aforementioned properties, the remainder to 100% of the active acid sites of the polymer being neutralised by monofunctional neutralisation agents.

The invention claimed is:

1. A dispersion and/or grinding-aid agent for mineral fillers in aqueous suspension, the agent comprising homopolymers and/or copolymers of acrylic and/or methacrylic acid with one or more acrylic, vinyl or allyl monomers, characterised in that the said homopolymers and/or copolymers of acrylic and/or methacrylic acid with one or more acrylic, vinyl or allyl monomers are neutralised so that the molar percentage of the active acid sites of the non-neutralised polymer is between 10% and 30% and that of the active acid sites neutralised by at least one at least bifunctional neutralisation agent is between 10% and 80%, the remainder to 100% of the active acid sites of the polymer being neutralised by monofunctional neutralisation agents.

2. The agent according to claim 1, characterised in that the said homopolymers and/or copolymers of acrylic and/or methacrylic acid with one or more acrylic, vinyl or allyl monomers are neutralised so that the molar percentage of the active acid sites of the non-neutralised polymer is between 15% and 30% and that of the active acid sites neutralised by at least one at least bifunctional neutralisation agent is between 15% and 60%, the remainder to 100% of the active acid sites of the polymer being neutralised by monofunctional neutralisation agents.

3. The agent according to claim 1, charactensed in that the at least bifunctional neutralisation agents are selected from the group consisting of hydroxides of alkaline-earth cations, hydroxides of metallic cations, oxides of alkaline-earth cations, oxides of metallic cations, bifunctional amines, and mixtures thereof.

4. The agent according to claim 1, characterised in that the monofunctional neutralisation agents are selected from the group consisting of hydroxides of alkaline cations animonium hydroxide, aliphatic primary amines, cyclic primary amines, aliphatic secondary amines, and cyclic secondary amines.

5. The agent according to claim 1, characterised in that the said homopolymers and/or copolymers of acrylic and/or methacrylic acid with one or more acrylic, vinyl or allyl monomers have a mean molecular weight in terms of Mw weight of between 1000 and 50,000, as determined by aqueous gel permeation chromatography (GPC).

6. The agent according to claim 1, characterised in that the said agent is a homopolymer of acrylic or methacrylic acid.

7. The agent according to claim 1, characterised in that the said agent is a water-soluble copolymer of acrylic or methacrylic acid with one or more acrylic, vinyl or allyl monomers selected from the group consisting of acrylic acid, methacrylic acid, itaconic acid, crotonic acid, fumaric acid, maleic anhydride, 2-acrylamido-2-methyl-1-propanesulphonic acid in acidic or partially neutralised form, 2-methacrylamido-2-methyl-1-propanesulphonic acid in acidic or partially neutralised form, 3-methacrylamido-2-hydroxy-1-propanesulphonic acid in acidic or partially neutralised form, allylsulphonic acid, methallylsuiphonic acid, allyloxybenzene suiphonic acid, methallyloxybenzene sulphonic acid, 2-hydroxy-3-(2-propenyloxy)propanesulphonic acid, 2-methyl-2-propene-1-sulphonic acid, ethylene suiphonic acid, propene suiphonic acid, 2-methyl suiphonic acid, styrene suiphonic acid and/or its salts, vinyl suiphonic acid, sodium methallylsuiphonate, suiphopropyl acrylate or methacrylate, suiphomethylacrylamide, suiphomethylmethacrylamide, acrylamide, methacrylamide, esters of acrylic and methacrylic acids, vinylpyrrolidone, vinylcaprolactam, isobutylene, diisobutylene, vinyl acetate, styrene, alphamethylstyrene, vinylmethylether, the allyls, and derivatives thereof.

8. The agent according to claim 1, characterised in that the said agent may, optionally before or after the neutralisation reaction, be treated and separated into several phases by means of one or more polar solvents selected from the group consisting of water, methanol, ethanol, propanol, isopropanol, the butanols, acetone, tetrahydrofuran and mixtures thereof.

9. The agent according to claim 1, characterised in that the said agent is in powder form.

10. The agent according to claim 1, characterised in that the said agent is introduced at the rate of 0.05% to 5% by dry weight with respect to the dry weight of mineral material.

11. An aqueous suspension of mineral particles obtained by grinding, characterised in that it contains the grinding-aid agent of claim 1 and in that its aqueous phase contains less than 10% of the quantity of grinding-aid agent initially introduced into the suspension before the grinding operation, determined by the total organic carbon measurement method known as the TOC method.

12. An aqueous suspension of mineral particles according to claim 11, characterised in that it contains 0.05% to 5% by dry weight, with respect to the dry weight of mineral material, of the grinding-aid agent, and in that its aqueous phase contains less than 10% of the quantity of grinding-aid agent initially introduced into the suspension before the grinding operation, determined by the total organic carbon measurement method known as the TOC method.

13. An aqueous suspension of mineral particles obtained by dispersion, characterised in that it contains the dispersion agent of claim 1 and in that its aqueous phase contains less than 60% of the quantity of dispersion agent introduced into the suspension, determined by the total organic carbon measurement method known as the TOC method.

14. An aqueous suspension of mineral particles according to claim 13, characterised in that it contains 0.05% to 5% by dry weight, with respect to the dry weight of mineral material, of the dispersion agent, and in that its aqueous phase contains less than 60% of the quantity of dispersion agent introduced into the suspension, determined by the total organic carbon measurement method known as the TOC method.

15. An aqueous suspension of mineral particles according to claim 11, characterised in that the mineral particles are selected from the group consisting of natural calcium carbonate, synthetic calcium carbonate, dolomites, magnesium hydroxide, gypsum, aluminium hydroxide, and mixtures thereof.

16. A method of using an aqueous suspension, the method comprising manufacturing a sheet of paper using the aqueous suspension of claim 11.

17. Paper manufactured and/or coated by the use of the aqueous suspension of claim 11.

18. Paper coated according to claim 17, characterised in that it has increased printability.

19. The agent according to claim 2, charactensed in that the at least bifunctional neutralisation agents are selected from the group consisting of hydroxides of alkaline-earth cations, hydroxides of metallic cations, oxides of alkaline-earth cations, oxides of metallic cations, bifunctional amines, and mixtures thereof.

20. The agent according to claim 2, characterised in that the monofunctional neutralisation agents are selected from the group consisting of hydroxides of alkaline cations, ammonium hydroxide, aliphatic primary amines, cyclic primary amines, aliphatic secondary amines, and cyclic secondary amines.

21. The agent according to claim 2, characterised in that the said homopolymers andlor copolymers of acrylic and/or methacrylic acid with one or more acrylic, vinyl or allyl monomers have a mean molecular weight in terms of Mw weight of between 1000 and 50,000, as determined by aqueous gel permeation chromatography (GPC).

22. The agent according to claim 2, characterised in that the said agent is a homopolymer of acrylic or methacrylic acid.

23. The agent according to claim 2, characterised in that the said agent is a water-soluble copolymer of acrylic or methacrylic acid with one or more acrylic, vinyl or allyl monomers selected from the group consisting of acrylic acid, methacrylic acid, itaconic acid, crotonic acid, fumaric acid, maleic anhydride, 2-acrylamido-2-methyl-1-propane-sulphonic acid in acidic or partially neutralised form, 2-methacrylamido-2-methyl-1-propanesulphonic acid in acidic or partially neutralised form, 3-methacrylamido-2-hydroxy-1-propanesulphonic acid in acidic or partially neutralised form, allylsulphonic acid, methallylsulphonic acid, allyloxybenzene sulphonic acid, methallyloxybenzene sulphonic acid, 2-hydroxy-3-(2-propenyloxy)propanesulphonic acid, 2-methyl-2-propene-1-sulphonic acid, ethylene sulphonic acid, propene sulphomc acid, 2-methyl sulphonic acid, styrene sulphonic acid and/or its salts, vinyl sulphonic acid, sodium methallylsulphonate, sulphopropyl acrylate or methacrylate, sulphomethylacrylamide, sulphomethylmethacrylamide, acrylamide, methacrylamide, esters of acrylic and methacrylic acids, vinylpyrrolidone, vinylcaprolactam, isobutylene, diisobutylene, vinyl acetate, styrene, alphamethylstyrene, vinylmethylether, the allyls, and derivatives thereof.

24. The agent according to claim 2, characterised in that the said agent may, optionally before or after the neutralisation reaction, be treated and separated into several phases by means of one or more polar solvents selected from the group consisting of water, methanol, ethanol, propanol, isopropanol, the butanols, acetone, tetrahydrofuran, and mixtures thereof.

25. The agent according to claim 2, characterised in that the said agent is in powder form.

26. The agent according to claim 2, characterised in that the said agent is introduced at the rate of 0.05% to 5% by dry weight with respect to the dry weight of mineral material.

27. An aqueous suspension of mineral particles obtained by grinding, characterised in that it contains the grinding-aid agent of claim 2 and in that its aqueous phase contains less than 10% of the quantity of grinding-aid agent initially introduced into the suspension before the grinding operation, determined by the total organic carbon measurement method known as the TOC method.

28. An aqueous suspension of mineral particles according to claim 27, charactensed in that it contains 0.05% to 5% by dry weight, with respect to the dry weight of mineral material, of the grinding-aid agent, and in that its aqueous phase contains less than 10% of the quantity of grinding-aid agent initially introduced into the suspension before the grinding operation, determined by the total organic carbon measurement method known as the TOC method.

29. An aqueous suspension of mineral particles obtained by dispersion, charactensed in that it contains the dispersion agent of claim 2 and in that its aqueous phase contains less than 60% of the quantity of dispersion agent introduced into the suspension, determined by the total organic carbon measurement method known as the TOC method.

30. An aqueous suspension of mineral particles according to claim 29, characterised in that it contains 0.05% to 5% by dry weight, with respect to the dry weight of mineral material, of the dispersion agent, and in that its aqueous phase contains less than 60% of the quantity of dispersion agent introduced into the suspension, determined by the total organic carbon measurement method known as the TOC method.

31. An aqueous suspension of mineral particles according to claim 13, characterised in that the mineral particles are selected from the group consisting of natural calcium carbonate, synthetic calcium carbonate, dolomites, magnesium hydroxide, gypsum, aluminium hydroxide, and mixtures thereof.

32. An aqueous suspension of mineral particles according to claim 27, characterised in that the mineral particles are selected from the group consisting of natural calcium carbonate, synthetic calcium carbonate, dolomites, magnesium hydroxide, gypsum, aluminium hydroxide, and mixtures thereof.

33. An aqueous suspension of mineral particles according to claim 29, characterised in that the mineral particles are selected from the group consisting of natural calcium carbonate, synthetic calcium carbonate, dolomites, magnesium hydroxide, gypsum, aluminium hydroxide, and mixtures thereof.

34. A method of using an aqueous suspension, the method comprising manufacturing a sheet of paper using the aqueous suspension of claim 13.

35. A method of using an aqueous suspension, the method comprising manufacturing a sheet of paper using the aqueous suspension of claim 27.

36. A method of using an aqueous suspension, the method comprising manufacturing a sheet of paper using the aqueous suspension of claim 29.

37. Paper manufactured and/or coated by the use of the aqueous suspension of claim 13.

38. Paper manufactured and/or coated by the use of the aqueous suspension of claim 27.

39. Paper manufactured and/or coated by the use of the aqueous suspension of claim 29.

40. Paper coated according to claim 37, characterized in that it has increased printability.

41. Paper coated according to claim 38, characterized in that it has increased printability.

42. Paper coated according to claim 39, characterized in that it has increased printability.

43. The agent according to claim 3, characterised in that the at least bifunctional neutralisation agents are selected from the group consisting of bifunctional amines.

* * * * *